(12) United States Patent
Bensberg et al.

(10) Patent No.: US 11,481,321 B2
(45) Date of Patent: Oct. 25, 2022

(54) ASYNCHRONOUS GARBAGE COLLECTION IN PARALLEL TRANSACTION SYSTEM WITHOUT LOCKING

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 658 days.

(21) Appl. No.: 15/469,818

(22) Filed: Mar. 27, 2017

(65) Prior Publication Data

US 2018/0276122 A1 Sep. 27, 2018

(51) Int. Cl.
G06F 12/02 (2006.01)

(52) U.S. Cl.
CPC ...... *G06F 12/0269* (2013.01); *G06F 12/0253* (2013.01); *G06F 2212/1024* (2013.01); *G06F 2212/154* (2013.01); *G06F 2212/163* (2013.01); *G06F 2212/70* (2013.01)

(58) Field of Classification Search
CPC ............. G06F 12/0269; G06F 12/0253; G06F 2212/163; G06F 2212/70; G06F 2212/1024; G06F 2212/154
USPC .......................................................... 707/820
See application file for complete search history.

(56) References Cited

U.S. PATENT DOCUMENTS

| | | | |
|---|---|---|---|
| 5,848,423 A * | 12/1998 | Ebrahim | G06F 12/0253 |
| 8,370,316 B2 | 2/2013 | Bensberg et al. | |
| 8,812,564 B2 | 8/2014 | Peh et al. | |
| 8,868,594 B2 | 10/2014 | Baeumges et al. | |
| 8,880,565 B2 | 11/2014 | Fricke et al. | |
| 9,177,025 B2 | 11/2015 | Bensberg et al. | |
| 9,223,829 B2 | 12/2015 | Faerber et al. | |
| 9,372,907 B2 | 6/2016 | Leu et al. | |
| 9,411,866 B2 | 8/2016 | Bartholoma et al. | |
| 2005/0108211 A1* | 5/2005 | Karimisetty | G06F 16/81 |
| 2005/0132374 A1* | 6/2005 | Flood | G06F 12/0276 718/100 |
| 2006/0167960 A1* | 7/2006 | Lomet | G06F 16/2322 |
| 2007/0011415 A1* | 1/2007 | Kaakani | G06F 12/0269 711/159 |
| 2011/0145304 A1* | 6/2011 | Gray | G06F 9/3004 707/820 |

(Continued)

*Primary Examiner* — Tony Mahmoudi
*Assistant Examiner* — Kamal K Dewan
(74) *Attorney, Agent, or Firm* — Fish & Richardson P.C.

(57) ABSTRACT

Methods, systems, and computer-readable storage media for determining that a transaction of a plurality of transactions performed in at least a portion of a system includes a delete operation, the plurality of transactions being managed by a secondary transaction manager and including a subset of all transactions performed in the system, in response to the delete operation, inserting a clean-up entry in the secondary transaction manager, attaching the clean-up entry to a subsequent transaction in order to determine and assign a time to the cleanup-entry that is used to subsequently trigger garbage collection, and selectively comparing the time to a most-recently-reported minimum read timestamp that is periodically reported to the secondary transaction manager from a primary transaction manager of the system, wherein the clean-up entry is executed in response to determining that the time is less than the most-recently-reported minimum read timestamp.

18 Claims, 5 Drawing Sheets

(56) References Cited

U.S. PATENT DOCUMENTS

| | | | |
|---|---|---|---|
| 2012/0066193 A1* | 3/2012 | King | G06F 12/0269 707/704 |
| 2012/0158680 A1* | 6/2012 | Shaughnessy | G06F 16/2365 707/703 |
| 2012/0167098 A1* | 6/2012 | Lee | G06F 16/2379 718/101 |
| 2012/0254249 A1* | 10/2012 | Starkey | G06F 16/27 707/792 |
| 2013/0318128 A1 | 11/2013 | Zahn et al. | |
| 2014/0149353 A1* | 5/2014 | Lee | G06F 16/174 707/639 |
| 2015/0067286 A1* | 3/2015 | Colgrove | G06F 3/0688 711/162 |
| 2015/0106556 A1* | 4/2015 | Yu | G11C 16/349 711/103 |
| 2015/0193264 A1* | 7/2015 | Hutton | G06F 9/54 719/328 |
| 2015/0324382 A1 | 11/2015 | Seufert et al. | |
| 2016/0086260 A1* | 3/2016 | Vermeulen | G06Q 40/00 705/35 |
| 2016/0110403 A1* | 4/2016 | Lomet | G06F 16/2322 707/695 |
| 2016/0147906 A1* | 5/2016 | Schreter | G06F 16/2322 707/781 |
| 2016/0210228 A1* | 7/2016 | Tandel | G06F 12/0253 |
| 2016/0328437 A1* | 11/2016 | Bacalzo | G06F 16/2365 |
| 2016/0342630 A1* | 11/2016 | Dietterich | G06F 12/0261 |
| 2017/0024315 A1* | 1/2017 | Leshinsky | G06F 12/0253 |
| 2017/0139980 A1* | 5/2017 | Coskun | G06F 16/2329 |
| 2018/0075089 A1* | 3/2018 | Diaconu | G06F 16/27 |

\* cited by examiner

ASYNCHRONOUS GARBAGE COLLECTION IN PARALLEL TRANSACTION SYSTEM WITHOUT LOCKING

BACKGROUND

Database systems can include a transaction manager that coordinates transactions to be executed on different parts of the database system. For example, a transaction manager can coordinate transactions to be executed on tables stored in the database system (e.g., reading data from, writing data to, deleting data from), as well as transactions to be executed on documents stored in a document store (e.g., adding documents to, deleting documents from). Accordingly, parallel transactions can be executed in different portions of the database system.

Transactions can affect computer-readable memory. For example, deletion of data can indicate that memory containing that data can be freed to store other data. This can be the case when a transaction deletes a document from the document store. However, because other transactions may be ongoing (e.g., parallel transactions), the memory may not be able to be immediately freed. For example, a parallel transaction may still need to reference the data that is to be deleted from memory. If the memory manager (responsible for freeing memory) is unaware of all of the ongoing transactions in the database system, the memory manager cannot determine when the memory can be freed.

SUMMARY

Implementations of the present disclosure include computer-implemented methods for asynchronous garbage collection in parallel transaction systems. In some implementations, actions include determining that a transaction of a plurality of transactions performed in at least a portion of a system includes a delete operation, the plurality of transactions being managed by a secondary transaction manager and including a subset of all transactions performed in the system, in response to the delete operation, inserting a clean-up entry in the secondary transaction manager, attaching the clean-up entry to a subsequent transaction in order to determine and assign a time to the cleanup-entry that is used to subsequently trigger garbage collection, and selectively comparing the time to a most-recently-reported minimum read timestamp that is periodically reported to the secondary transaction manager from a primary transaction manager of the system, wherein the clean-up entry is executed in response to determining that the time is less than the most-recently-reported minimum read timestamp. Other implementations of this aspect include corresponding systems, apparatus, and computer programs, configured to perform the actions of the methods, encoded on computer storage devices.

These and other implementations can each optionally include one or more of the following features: a minimum read timestamp is a lowest read timestamp of all executing transactions in the system including at least one transaction that is not included the subset of all transactions; the time assigned to the clean-up entry is equal to a commit timestamp of a last-committed parallel transaction; actions further include attaching the clean-up entry to a next subsequent transaction in response to determining that the time is not less than the most-recently-reported minimum read timestamp; the secondary transaction manager delegates the clean-up entry to a clean-up manager, the clean-up manager executing the clean-up entry; the primary transaction manager is informed of all transactions being performed in the system; and the system includes a database system, and the at least a portion includes a document store of the database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to asynchronous garbage collection in parallel transaction systems. In general, garbage collection can be described as automatic memory management, in which a computer-implemented memory manager (also referred to as a garbage collector) reclaims memory occupied by data that is no longer in use by a system, such as a database system. Implementations of the present disclosure are particularly directed to maintaining pendency of a clean-up entry (that can be executed to free memory) until any parallel transactions are executed.

Implementations can include actions of determining that a transaction of a plurality of transactions performed in at least a portion of a system includes a delete operation, the plurality of transactions being managed by a secondary transaction manager and including a subset of all transactions performed in the system, in response to the delete operation, inserting a clean-up entry in the secondary transaction manager, attaching the clean-up entry to a subsequent transaction in order to determine and assign a time to the cleanup-entry that is used to subsequently trigger garbage collection, and selectively comparing the time to a most-recently-reported minimum read timestamp that is periodically reported to the secondary transaction manager from a primary transaction manager of the system, wherein the clean-up entry is executed in response to determining that the time is less than the most-recently-reported minimum read timestamp.

Figure 1:
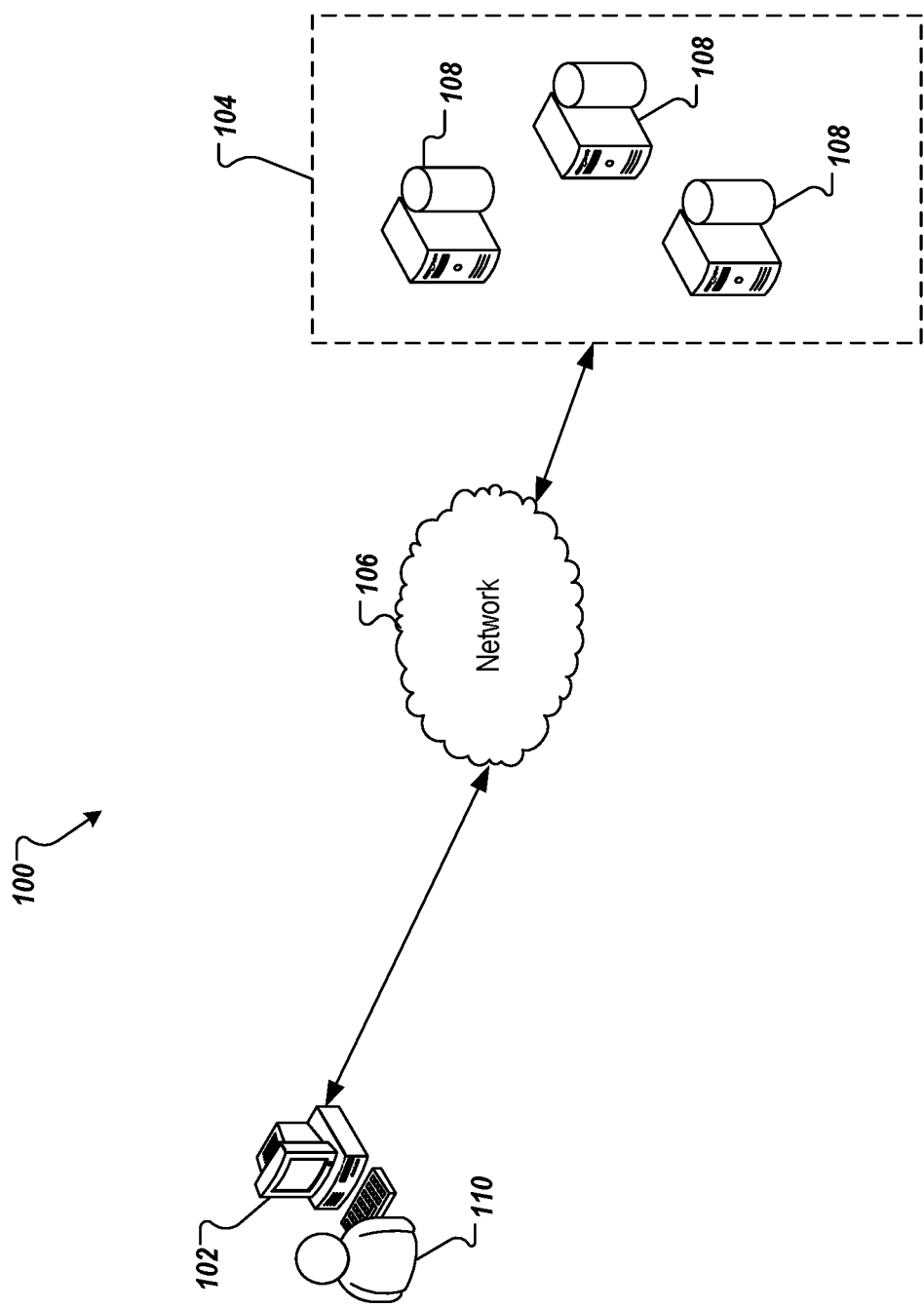
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a database system that stores data. In some examples, the database system can store data in tables. In some examples, the database system can store documents (e.g., electronic files). In some examples, the client device 102 can interact with the database system to access data stored therein. For example, the client device 102 can interact with the database system to read data from, delete data from, add data to, and/or modify data within one or more tables. As another example, the client device 102 can interact with the database system to read a document from, delete a document from, and/or edit a document within a document store. It is contemplated that other devices, such as server systems, can interact with the database system over the network 106.

An example database system can include an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

As introduced above, implementations of the present disclosure are directed to asynchronous garbage collection in parallel transaction systems. More particularly, implementations of the present disclosure are directed to maintaining pendency of a clean-up entry (that can be executed to free memory) until any parallel transactions are executed. Implementations of the present disclosure particularly addresses systems, in which a secondary transaction manager does not have visibility to all transaction of the system, as described in further detail herein.

Figure 2:
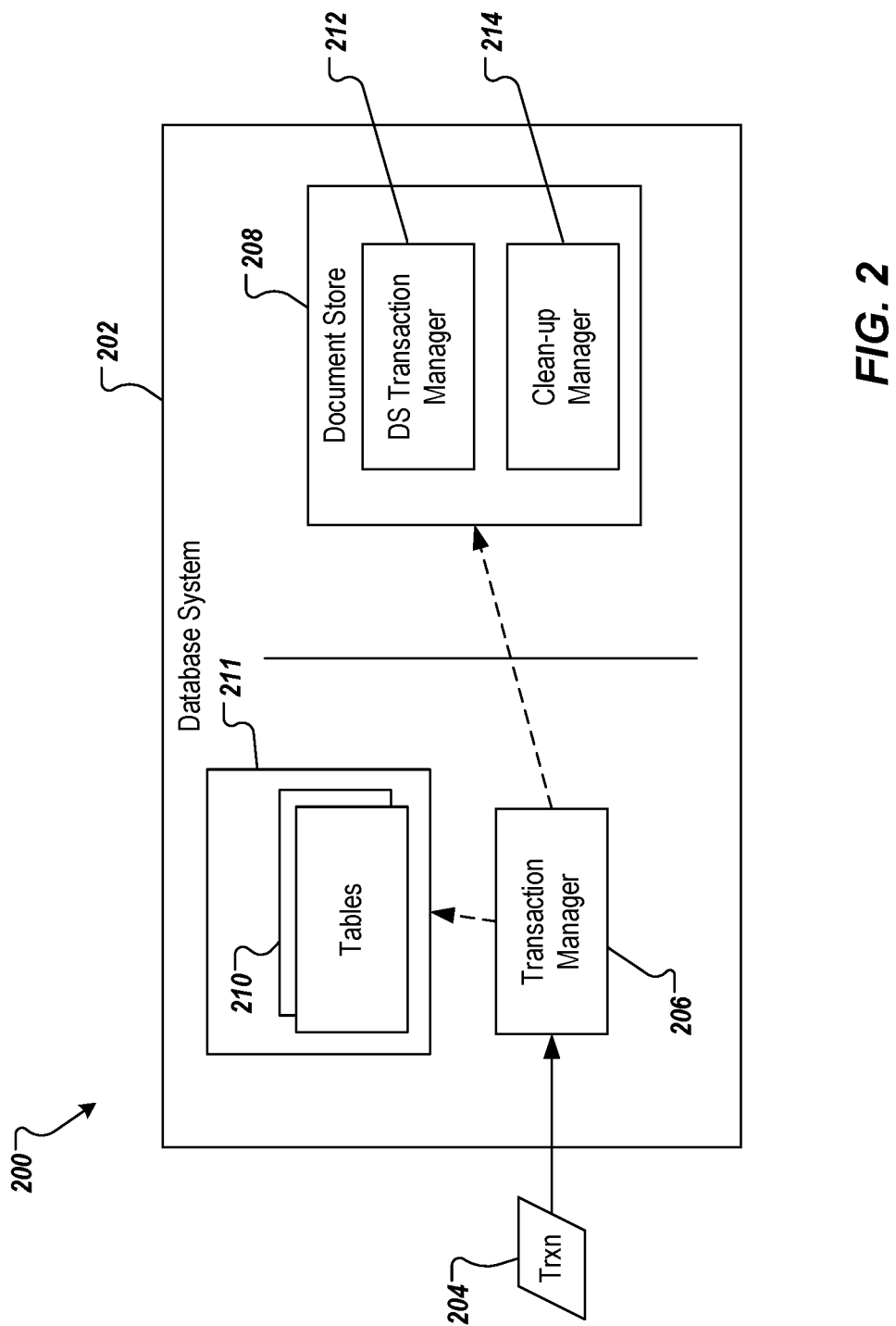
FIG. 2 depicts an example conceptual architecture in accordance with implementations of the present disclosure.

FIG. 2 depicts an example conceptual architecture 200 in accordance with implementations of the present disclosure. The conceptual architecture 200 includes a database system 202 that receives transaction data 204. In some examples, the transaction data 204 indicates a transaction that is to be performed by the database system. In the depicted example, the database system 202 includes a transaction manager 206, and a document store 208. In some examples, the transaction manager 206 is a primary manager that is informed of all transactions that are to be performed in the database system 202. For example, the transaction data 204 can indicate a transaction associated with data stored in one or more tables 210 of a column/row store 211, and the transaction manager is informed of execution of the transaction on the tables 210. Example transactions can include reading data from, writing data to, deleting data from, and modifying data within a table. As another example, the transaction data 204 can indicate a transaction associated with one or more documents stored in the document store 208. Example transactions can include modifying documents within, adding documents to, and deleting documents from the document store 208. In the depicted example, the document store 208 includes a document store (DS) transaction manager 212, and a clean-up manager 214. In some examples, the DS transaction manager 212 coordinates transactions to be executed within the document store 208.

In some examples, a database abstraction layer (e.g., a SQL layer) (not shown in FIG. 2) coordinates communication between an application (e.g., executing on an application server), and the database system 202. In some examples, the database abstraction layer analyzes an incoming statement (e.g., insert, update, delete, select), and forwards it to the proper store (e.g., the column/row store for tables, or the document store 208). When forwarding transactions, the transaction manager 206 is involved in assigning, for example, a transaction identifier, timestamps, and the like. In some examples, this information is provided to the DS transaction manager 212 for transactions being executed in the document store 208.

In some implementations, the transaction manager 206 can be referred to as a primary transaction manager within the database system 202, and the DS transaction manager 212 can be referred to as a secondary transaction manager within the database system 202. As a primary transaction manager, the transaction manager 206 is informed of all transactions within the database system 202, and is therefore, aware of all transactions within the database system 202. As a secondary transaction manager, the DS transaction manager 212 is only informed of transactions executing in the document store 208, and is unaware of other transactions within the database system 202.

In some examples, when a transaction is completed, the transaction is assigned a commit timestamp (commitTS) upon completion (committal) of the transaction, and a read timestamp (readTS) when the transaction starts. In some examples, the readTS is equal to the highest previously assigned commitTS. Logically, this means that a transaction may see all operations, which have been committed before the transaction starts. A minimum readTS (minreadTS) is also provided, and is the lowest readTS of all running transactions (parallel transactions) in the system. Although the primary transaction manager is continuously aware of the minreadTS, the secondary transaction manager is not. Instead, the primary transaction manager periodically informs the secondary transaction manager of the current value of the minreadTS.

In some examples, every data object in the database is assigned a commitTS, which is equal to the commitTS of the transaction that created the object. For example, when a document is inserted, the document is assigned the commitTS of the transaction that was executed to insert the document, upon completion of the transaction (e.g., after the transaction commits). If, in a subsequent transaction, the document is deleted the delete entry is also assigned a commitTS. However, the database system 202 has to keep the deleted version of the document for some period of time, because other (parallel) transaction, which started earlier than the delete transaction, may need access to the document. For example, the earlier started transaction cannot see that a delete transaction was executed. More particularly, the deleted document should be available until the minreadTS is higher than the commitTS of the delete entry.

In accordance with implementations of the present disclosure, a transaction performed in the document store 208 can include deleting data (e.g., a delete transaction deleting a document from the document store 208). In some implementations, at some point after the delete transaction is performed, the clean-up manager 214 executes garbage collection to free-up the memory, within which the deleted data is stored. In this manner, the memory is made available to store other data. Garbage collection can be described as automatic memory management, in which a computer-implemented memory manager (also referred to as a garbage collector), such as the clean-up manager 214, reclaims memory occupied by data that is no longer in use by a system, such as the database system 202. In some examples, a delete operation is synonymous with an update operation. For example, during an update, an old version of data is still present, and is substituted with a new version of the data. At a given point in time, the old version may be deleted from memory (e.g., garbage-collected).

In some instances, however, another transaction may be executing in parallel, and may require access to the data that is to be deleted in response to the delete transaction. Consequently, the clean-up manager cannot delete the data upon completion of the delete transaction, and must wait until a future point in time (e.g., when any and all parallel transactions needing access to the data have completed). This can be problematic, however, because the document store 208, namely the DS transaction manager 212, is not aware of all parallel transactions that may still be executing in the database system 202, and need access to the to-be-deleted data.

In view of this, implementations of the present disclosure, enable a clean-up entry to be logged in the transaction manager, and remain pending until a subsequent point in time. In some implementations, the clean-up entry is assigned a time that is based on a commitTS of a parallel transaction that is committed, in particular, the last parallel transaction. The time is compared to the most recently reported minreadTS (reported from the primary transaction manager to the secondary transaction manager). If the time is less than the most recently reported minreadTS, the clean-up entry is executed (e.g., by the memory manager). If the time is not less than the most recently reported minreadTS, the clean-up entry is attached to a next subsequent transaction. When a subsequent transaction that the clean-up entry is attached to commits, the time is again compared to the then most recently reported minreadTS, and the process continues until the clean-up entry is able to be executed.

Figure 3:
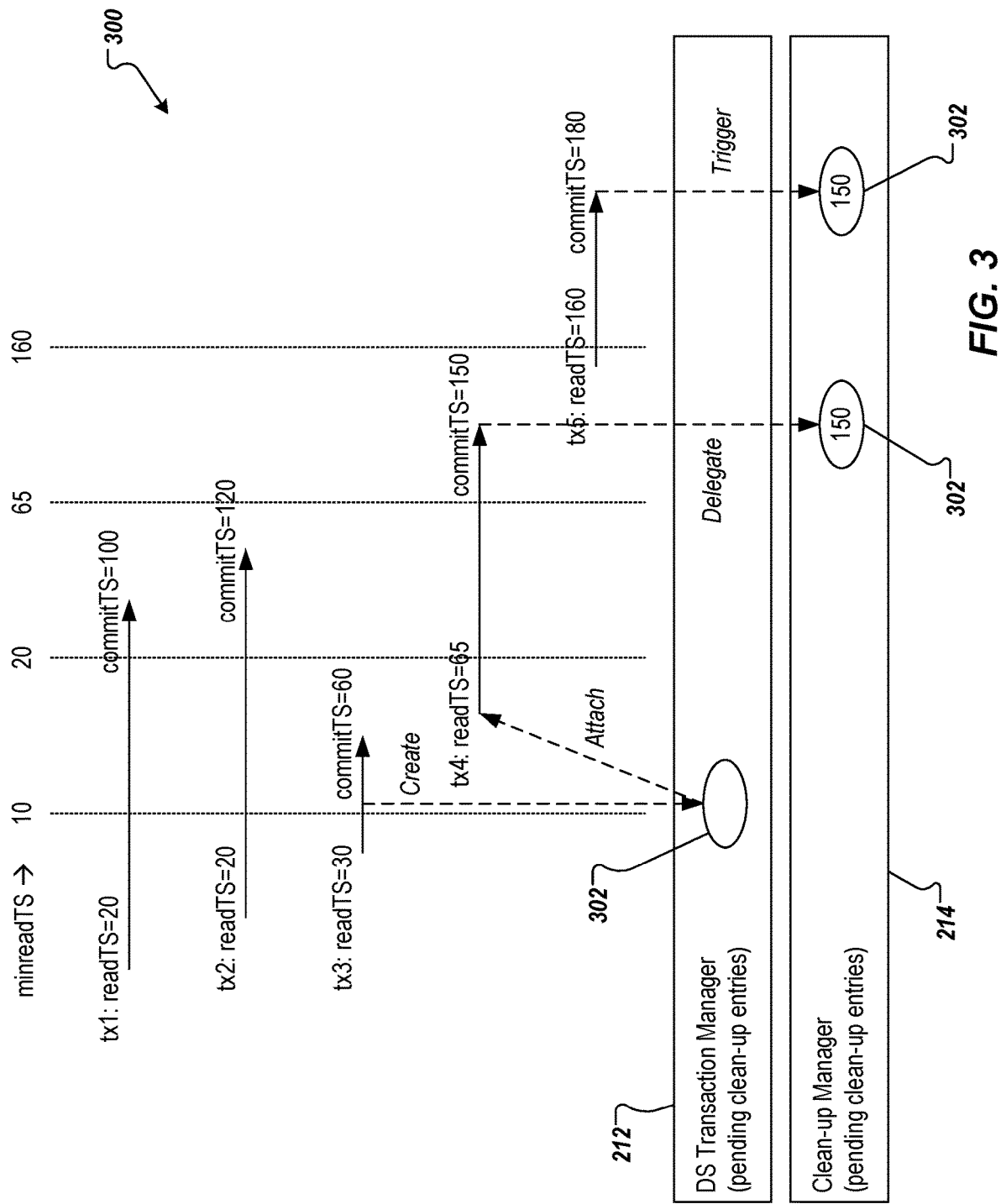
FIG. 3 depicts an example transaction timeline in accordance with implementations of the present disclosure.

FIG. 3 depicts an example transaction timeline 300 in accordance with implementations of the present disclosure. The examples transaction timeline 300 includes a first transaction (tx1), a second transaction (tx2), a third transaction (tx3), a fourth transaction (tx4), and a fifth transaction (tx5). In the depicted example, the third transaction begins and ends while the first transaction and the second transaction are being performed (e.g., before either the first transaction or the second transaction are committed). The fourth transaction begins after the third transaction is committed, and ends after both the first transaction and the second transaction are committed. The fifth transaction begins after the fourth transaction is committed.

In the example of FIG. 3, the vertical lines with numerical markers (e.g., 10, 20, 65, 160) indicate instances where the primary transaction manager (e.g., the transaction manager 206) has informed the secondary transaction manager (e.g., the DS transaction manager 212). In some examples, the respective numerical values are the minreadTS values reported by the primary transaction manager.

For purposes of illustration, the first transaction can be provided as a data insertion (e.g., insert {key=10}), which is assigned a readTS equal to 20. Consequently, the insertion (e.g., insert {key=10}) can be stored to memory (e.g., in a slice memory block). The second transaction can be provided as a data selection (e.g., selecting all available data). Consequently, the selection may read all data that was committed before or with commitID=20 as this is the readTS for that transaction. It cannot yet read the data {key=10} that is being inserted by the parallel transaction (the first transaction). But, it may, for example, read {key=5} that was inserted and committed before with another transaction that is not depicted in FIG. 3. The third transaction can be provided as a data deletion (e.g., delete {key=5}), which is assigned a readTS equal to 30. Consequently, the deletion (e.g., delete {key=5}) can be stored to memory. Accordingly, the memory can store the insertions of the first transaction, and the deletion of the third transaction.

In the example of FIG. 3, at some point after the third transaction begins, the primary transaction manager informs the secondary transaction manager that the then-current minreadTS is equal to 10. This means that there is at least one non-committed transaction in the system having a readTS equal to 10 (e.g., a transaction that the secondary transaction manager is unaware of).

The third transaction is committed, and is assigned a commitTS equal to 60. Because the third transaction is a deletion, a clean-up entry 302 is entered to the secondary transaction manager (e.g., the DS transaction manager 212), but does not yet have an indication as to when the clean-up entry is to be performed by the clean-up manager 214. In accordance with implementations of the present disclosure, the clean-up entry 302 remains pending without a time indicator, irrespective of any ongoing or parallel transactions (aware or unaware). The reason is that a point in time which is sufficiently far in the future when the clean-up entry 302 may be executed is unknown, due to the possible existence of unaware transactions. As described in further detail herein, implementations of the present disclosure enable such a point in time to be determined by taking another transaction that started in the future (per transaction, their readTS are always known) and using its commitTS instead of the own commitTS.

Continuing with the example of FIG. 3, the fourth transaction begins and is assigned a readTS equal to 65. The clean-up entry 302 is attached to the fourth transaction, as it is a newly started transaction. In accordance with the present disclosure, the fourth transaction is used to eventually determine a commitTS that is sufficiently far in the future, as mentioned as a pre-requisite before. In the example of FIG. 3, at some point after the fourth transaction begins, the primary transaction manager informs the secondary transaction manager that the then-current minreadTS is equal to 20. This means that there is at least one non-committed transaction in the system having a readTS equal to 20 (e.g., a transaction that the secondary transaction manager is unaware of, and/or the first transaction and the second transaction).

Continuing with the example of FIG. 3, the first transaction is committed and is assigned a commitTS equal to 100, and the second transaction is committed, and is assigned a commitTS equal to 120. Accordingly, the third transaction occurred and was committed, while the first transaction and the second transaction were executed in parallel. However, the clean-up entry 302 corresponding to the third transaction still remains pending, as the fourth transaction has not yet committed. Continuing with the example of FIG. 3, at some point after the fourth transaction begins, the primary transaction manager informs the secondary transaction manager that the then-current minreadTS is equal to 65. This means that there is at least one non-committed transaction in the system having a readTS equal to 65 (e.g., a transaction that the secondary transaction manager is unaware of). Thereafter, fourth transaction is committed and is assigned a commitTS equal to 150.

The clean-up entry 302 is assigned a time equal to the commitTS of the fourth transaction. This is independent from any other transactions running in parallel in the system. Even if the first or second transactions were still running, commitTS could be used as a time indicator. This is because clean-up is only executed based on the provided minreadTS, and the minreadTS would not be increased by the leading transaction manager, if there were still transactions running. In the example of FIG. 3, the clean-up entry is assigned the time 150 (i.e., the commitTS of the fourth transaction), and is delegated to the clean-up manager 214. The clean-up entry 302, however, is not performed until the minreadTS reported to the secondary transaction manager exceeds the time assigned to the clean-up entry, and a next subsequent transaction is committed.

In the example of FIG. 3, the fifth transaction is the next subsequent transaction. When a transaction starts, it checks the clean-up manager for pending clean-up entries. If any exist—in this example clean-up entry 302 does exist—it is attached to the transaction. If, however, the next subsequent transaction is never committed, the clean-up entry is moved back to await attachment to another next subsequent transaction. In some examples, a transaction never commits, if the transaction is aborted. For example, if the fifth transaction is aborted, the clean-up entry 302 is moved back, and is attached to the next subsequent transaction (e.g., a sixth transaction, not depicted). The example of FIG. 3, however, depicts a scenario, in which the fifth transaction is committed (e.g., is not aborted).

Continuing with the example of FIG. 3, at some point after the fifth transaction begins, the primary transaction manager informs the secondary transaction manager that the then-current minreadTS is equal to 160. This means that there is at least one non-committed transaction in the system having a readTS equal to 160 (e.g., a transaction that the secondary transaction manager is unaware of, and/or the fifth transaction).

The fifth transaction is committed and is assigned a commitTS equal to 180. Because the clean-up entry 302 is attached to the fifth transaction, committal of the fifth transaction triggers a check between the time assigned to the clean-up entry 302 (e.g., 150), and the last minreadTS reported to the secondary transaction manager (e.g., 160). If the time assigned to the clean-up entry 302 is less than the last minreadTS reported to the secondary transaction manager, the clean-up entry 302 is executed by the clean-up manager 214 to remove the corresponding data from the memory. If the time assigned to the clean-up entry 302 is not less than the last minreadTS reported to the secondary transaction manager, the clean-up entry 302 is moved back to the secondary transaction manager, and is attached to the next subsequent transaction. In the example of FIG. 3, the time is less than the last-reported minreadTS, and the clean-up entry 302 is executed.

In some implementations, in order to execute a clean-up entry, the clean-up entry has to be attached to a transaction, and the only point in time when the clean-up of a clean-up entry is triggered is when that transaction commits. The pre-requisite is that the time of the clean-up entry is lower than the then-current minreadTS in the system. If this pre-requisite is not given or the transaction never commits, the clean-up entry is moved back to the clean-up manager where it awaits attachment to a subsequent transaction. In this manner, the clean-up does not occur at the earliest point in time when there are no transactions anymore that may see the data. In fact, the clean-up may be delayed significantly based on the workload in the system. As the amounts of data that are to be freed per clean-up entry are usually small, this delay is deemed acceptable, and normal for a garbage-collection system.

Figure 4:
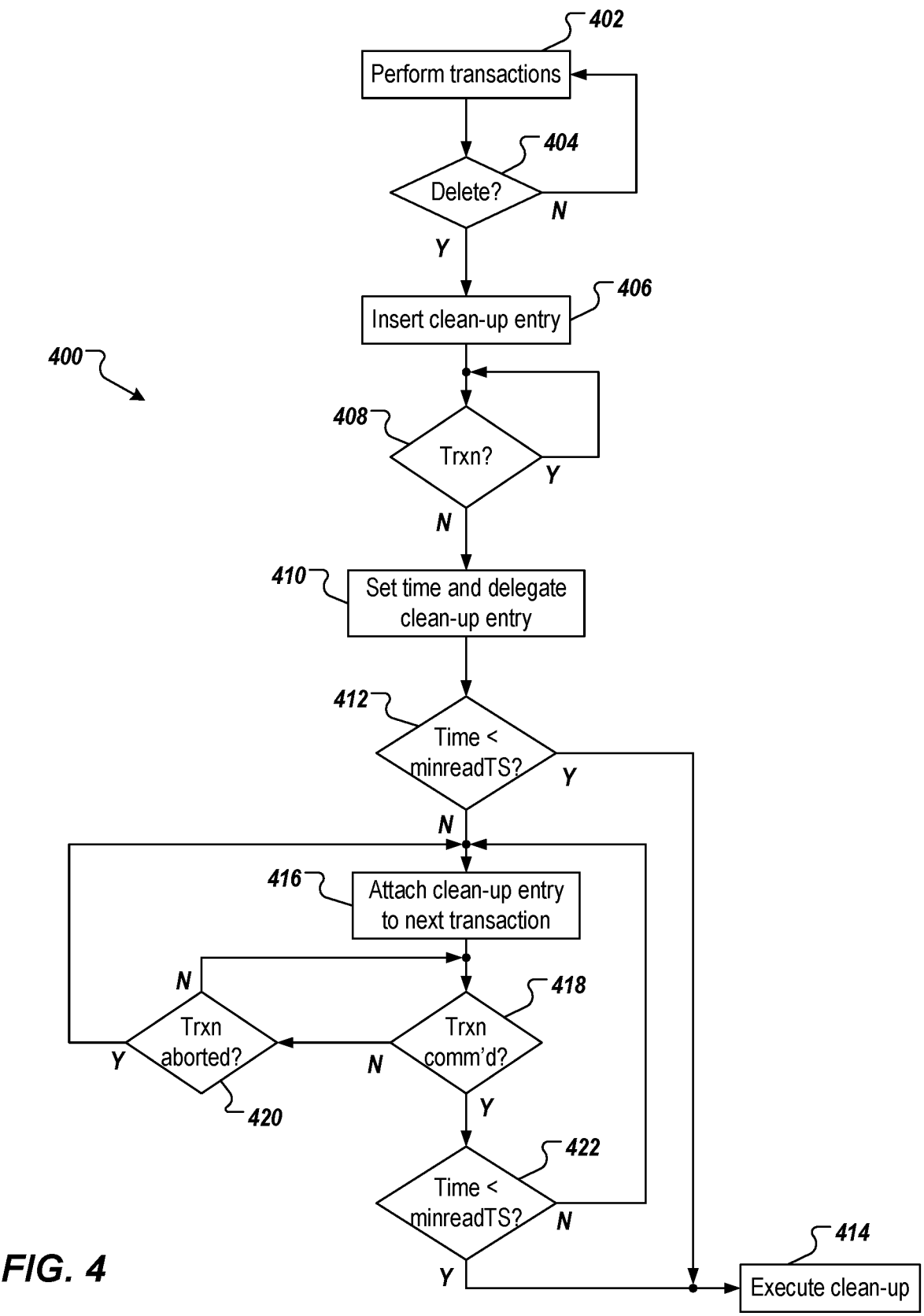
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. In some examples, the example process 400, or at least portions thereof, can be executed by the DS transaction manager 212 (e.g., a secondary transaction manager), and the clean-up manager 214 of FIGS. 2 and 3.

Transactions are performed (402). For example, multiple transactions are performed within a portion of a system (e.g., the database system 202 of FIG. 2), the transactions being informed to a secondary transaction manager (e.g., the DS transaction manager 212 of FIG. 2). In some examples, at least one transaction writes data to memory (e.g., a slice memory block). It is determined whether a delete operation (or update) is executed as part of a transaction (404). For example, a transaction can be performed to result in deletion of data from memory (e.g., from the slice memory block). An example of such a transaction includes the third transaction described above with reference to FIG. 3. If a delete operation is not executed, the example process 400 loops back.

If a delete operation is executed, a clean-up entry is inserted (406). For example, a clean-up entry (e.g., the clean-up entry 302 of FIG. 3) is provided within the secondary transaction manager (e.g., the DS transaction manager 212 of FIGS. 2 and 3). Upon insertion, and as described herein, the clean-up entry is initially absent a time used to determine when the clean-up entry is to be executed (e.g., by the clean-up manager 214 to free memory of the to-be-deleted data). This is because, at this point, it is not possible to determine a time that is sufficiently far in the future due to the secondary transaction manager's lack of knowledge of all parallel transactions in the system. However, and as described herein, the commitTS of the next subsequent transaction can be used. Accordingly, it is determined whether a next subsequent transaction is started (408). If not, the example process 400 loops back.

If so, the commitTS of the next subsequent transaction is set for the clean-up entry, and the clean-up entry is delegated to the clean-up manager (410). In the example of FIG. 3, the time is set equal to 150, which is the commitTS of the fourth transaction. It is determined whether the time is less than the most recently reported minreadTS (412). If the time is less than the minreadTS, the clean-up entry is executed (414). For example, the clean-up manager (e.g., the clean-up manager 214 of FIGS. 2 and 3) executes the clean-up entry to free the memory block from the data that is to be deleted. If the time is not less than the minreadTS, the clean-up entry is attached to the next transaction (416). In the example of FIG. 3, the time (150) assigned to the clean-up entry 302 is not less than the most recently reported minreadTS (65). Consequently, the clean-up entry is attached to the next subsequent transaction, the fifth transaction of FIG. 3.

It is determined whether the transaction has been committed (418). That is, it is determined whether the transaction that the clean-up entry is attached to has completed. If the transaction has not been committed, it is determined whether the transaction has aborted (420). If the transaction has aborted, the example process 400 loops back to attaching the clean-up entry to the next transaction (416). If the transaction has not aborted, the example process 400 loops back.

If the transaction has been committed, it is determined whether the time is less than the most recently reported minreadTS (422). If the time is less than the minreadTS, the clean-up entry is executed (414). For example, the clean-up manager (e.g., the clean-up manager 214 of FIGS. 2 and 3) executes the clean-up entry to free the memory block from the data that is to be deleted. If the time is not less than the minreadTS, the example process 400 loops back to attach the clean-up to the next transaction (416).

Implementations of the present disclosure provide one or more of the following example advantages. Implementations of the present disclosure enable a secondary transaction manager to process garbage collection given limited knowledge of the overall system state and/or parallel activities. This provides improvements over alternative approaches, which require expensive (in terms of computing resources) lookups, callback to the primary transaction manager, as well as locking. A consequence of locking would be a decrease of parallelism and/or contention.

Figure 5:
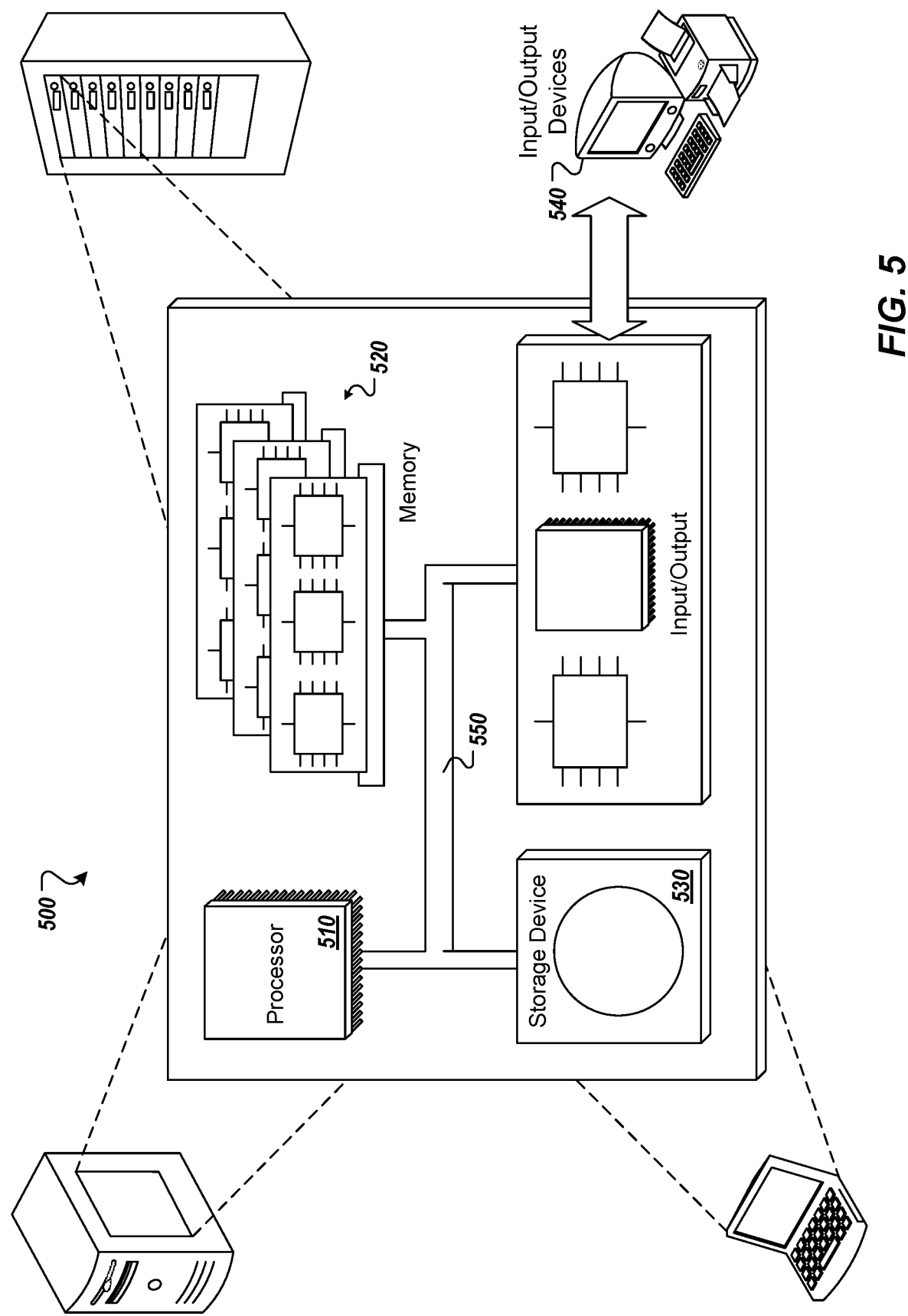
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for asynchronous garbage collection in parallel transaction systems, the method being executed by one or more processors and comprising:
   receiving, by the one or more processors, a transaction of a plurality of transactions that is to be executed in a database system, the database system comprising a column/row store storing one or more tables, a primary transaction manager, and a document store, the document store storing one or more documents, and comprising a secondary transaction manager and a clean-up manager, the primary transaction manager being informed of all of the plurality of transactions, the secondary transaction manager being only informed of a subset of transactions of the plurality of transactions that are executed in the document store based on a timing assigned by the primary transaction manager that considers execution of any parallel transactions, the secondary transaction manager being unaware of transactions within the database system that are outside the document store, and the clean-up manager executing garbage collection to free-up a memory of the document store;
   determining, by the one or more processors, that the transaction of the plurality of transactions performed in at least a portion of the database system comprises a delete operation of old version data;
   in response to the delete operation, inserting, by the one or more processors, a clean-up entry in the secondary transaction manager, the secondary transaction manager delegating the clean-up entry to the clean-up manager;
   attaching, by the one or more processors, the clean-up entry to a subsequent transaction in order to determine and to assign a time to the clean-up entry that is used to subsequently trigger garbage collection;
   comparing, by the one or more processors, the time to a most-recently-reported minimum read timestamp that is most recently reported to the secondary transaction manager by the primary transaction manager, wherein the primary transaction manager is continuously aware of minimum read timestamps associated with start times of the plurality of transactions and the primary transaction manager periodically reports to the secondary transaction manager the minimum read timestamps associated with start times of the subset of transactions that are affected by one or more read timestamps of one or more transactions of the plurality of transactions that are outside the subset of transactions and a pendency of the clean-up entry is maintained until a parallel transaction of the plurality of transactions associated with the transaction, invisible to the secondary transaction manager, is executed;
   determining, by the one or more processors, whether the time is less than the most-recently-reported minimum read timestamp; and
   in response to determining whether the time is less than the most-recently-reported minimum read timestamp, generating a trigger to execute the clean-up entry to delete the old version data.

2. The method of claim 1, wherein the most-recently-reported minimum read timestamp is a lowest read timestamp of all executing transactions in the database system comprising at least one transaction that is excluded from the subset of transactions.

3. The method of claim 1, wherein the time assigned to the clean-up entry is equal to a commit timestamp of a last-committed parallel transaction.

4. The method of claim 1, further comprising attaching the clean-up entry to a next subsequent transaction in response to determining that the time is not less than the most-recently-reported minimum read timestamp.

5. The method of claim 1, wherein the clean-up manager delays execution of the clean-up entry based on a workload of the database system.

6. The method of claim 1, wherein the primary transaction manager is informed of all transactions being performed in the database system.

7. A non-transitory computer-readable storage medium coupled to one or more processors and having instructions stored thereon which, when executed by the one or more processors, cause the one or more processors to perform operations for asynchronous garbage collection in parallel transaction systems, the operations comprising:

receiving a transaction of a plurality of transactions that is to be executed in a database system, the database system comprising a column/row store storing one or more tables, a primary transaction manager, and a document store, the document store storing one or more documents, and comprising a secondary transaction manager and a clean-up manager, the primary transaction manager being informed of all of the plurality of transactions, the secondary transaction manager being only informed of a subset of transactions of the plurality of transactions that are executed in the document store based on a timing assigned by the primary transaction manager that considers execution of any parallel transactions, the secondary transaction manager being unaware of transactions within the database system that are outside the document store, and the clean-up manager executing garbage collection to free-up a memory of the document store;

determining that the transaction of the plurality of transactions performed in at least a portion of the database system comprises a delete operation of old version data;

in response to the delete operation, inserting a clean-up entry in the secondary transaction manager, the secondary transaction manager delegating the clean-up entry to the clean-up manager;

attaching the clean-up entry to a subsequent transaction in order to determine and to assign a time to the clean-up entry that is used to subsequently trigger garbage collection;

comparing the time to a most-recently-reported minimum read timestamp that is most recently reported to the secondary transaction manager by the primary transaction manager, wherein the primary transaction manager is continuously aware of minimum read timestamps associated with start times of the plurality of transactions and the primary transaction manager periodically reports to the secondary transaction manager the minimum read timestamps associated with start times of the subset of transactions that are affected by one or more read timestamps of one or more transactions of the plurality of transactions that are outside the subset of transactions and a pendency of the clean-up entry is maintained until a parallel transaction of the plurality of transactions associated with the transaction, invisible to the secondary transaction manager, is executed;

determining that the time is less than the most-recently-reported minimum read timestamp; and in response to determining whether the time is less than the most-recently-reported minimum read timestamp, generating a trigger to execute the clean-up entry to delete the old version data.

8. The non-transitory computer-readable storage medium of claim 7, wherein the most-recently-reported minimum read timestamp is a lowest read timestamp of all executing transactions in the database system comprising at least one transaction that is excluded from the subset of transactions.

9. The non-transitory computer-readable storage medium of claim 7, wherein the time assigned to the clean-up entry is equal to a commit timestamp of a last-committed parallel transaction.

10. The non-transitory computer-readable storage medium of claim 7, wherein operations further comprise attaching the clean-up entry to a next subsequent transaction in response to determining that the time is not less than the most-recently-reported minimum read timestamp.

11. The non-transitory computer-readable storage medium of claim 7, wherein the clean-up manager delays execution of the clean-up entry based on a workload of the database system.

12. The non-transitory computer-readable storage medium of claim 7, wherein the primary transaction manager is informed of all transactions being performed in the database system.

13. A system, comprising:
a computing device; and
a computer-readable storage device coupled to the computing device and having instructions stored thereon which, when executed by the computing device, cause the computing device to perform operations for asynchronous garbage collection in parallel transaction systems, the operations comprising:
receiving a transaction of a plurality of transactions that is to be executed in a database system, the database system comprising a column/row store storing one or more tables, a primary transaction manager, and a document store, the document store storing one or more documents, and comprising a secondary transaction manager and a clean-up manager, the primary transaction manager being informed of all of the plurality of transactions, the secondary transaction manager being only informed of a subset of transactions of the plurality of transactions that are executed in the document store based on a timing assigned by the primary transaction manager that considers execution of any parallel transactions, the secondary transaction manager being unaware of transactions within the database system that are outside the document store, and the clean-up manager executing garbage collection to free-up a memory of the document store;

determining that the transaction of the plurality of transactions performed in at least a portion of the database system comprises a delete operation of old version data;

in response to the delete operation, inserting a clean-up entry in the secondary transaction manager, the secondary transaction manager delegating the clean-up entry to the clean-up manager;

attaching the clean-up entry to a subsequent transaction in order to determine and to assign a time to the clean-up entry that is used to subsequently trigger garbage collection;

comparing the time to a most-recently-reported minimum read timestamp that is most recently reported to the secondary transaction manager by the primary transaction manager, wherein the primary transaction manager is continuously aware of minimum read timestamps associated with start times of the plurality of transactions and the primary transaction manager periodically reports to the secondary transaction manager the minimum read timestamps associated with start times of the subset of transactions that are affected by one or more read timestamps of one or more transactions of the plurality of transactions that are outside the subset of transactions and a pendency of the clean-up entry is maintained until a parallel transaction of the plurality of transactions associated with the transaction, invisible to the secondary transaction manager, is executed;

determining that the time is less than the most-recently-reported minimum read timestamp; and in response to determining whether the time is less than the most-recently-reported minimum read timestamp, generating a trigger to execute the clean-up entry to delete the old version data.

14. The system of claim 13, wherein the most-recently-reported minimum read timestamp is a lowest read timestamp of all executing transactions in the database system comprising at least one transaction that is excluded from the subset of transactions.

15. The system of claim 13, wherein the time assigned to the clean-up entry is equal to a commit timestamp of a last-committed parallel transaction.

16. The system of claim 13, wherein operations further comprise attaching the clean-up entry to a next subsequent transaction in response to determining that the time is not less than the most-recently-reported minimum read timestamp.

17. The system of claim 13, wherein the clean-up manager delays execution of the clean-up entry based on a workload of the database system.

18. The system of claim 13, wherein the primary transaction manager is informed of all transactions being performed in the database system.

* * * * *